(12) United States Patent
Freeman

(10) Patent No.: US 9,190,116 B2
(45) Date of Patent: Nov. 17, 2015

(54) HARD DISC DRIVE COVER SEAL

(71) Applicant: Seagate Technology LLC, Cupertino, CA (US)

(72) Inventor: Robert David Freeman, Jeongja-dong (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 52 days.

(21) Appl. No.: 13/936,481

(22) Filed: Jul. 8, 2013

(65) Prior Publication Data

US 2015/0009789 A1    Jan. 8, 2015

(51) Int. Cl.

| G11B 17/03 | (2006.01) |
|---|---|
| G11B 33/02 | (2006.01) |
| G11B 33/04 | (2006.01) |
| G11B 33/06 | (2006.01) |
| G11B 33/08 | (2006.01) |
| H05K 5/02 | (2006.01) |
| H05K 5/03 | (2006.01) |
| H05K 5/06 | (2006.01) |
| G11B 33/14 | (2006.01) |
| G11B 25/04 | (2006.01) |

(52) U.S. Cl.
CPC .......... *G11B 33/1466* (2013.01); *G11B 25/043* (2013.01); *Y10T 29/49826* (2015.01)

(58) Field of Classification Search
CPC .............. G11B 25/043; G11B 33/1466; Y10T 29/49826
USPC ...................... 360/97.11–97.13, 99.15–99.22
See application file for complete search history.

(56) References Cited

U.S. PATENT DOCUMENTS

| 5,696,648 | A | 12/1997 | Jeong et al. |
| 6,061,204 | A | 5/2000 | Tong |
| 6,392,838 | B1 * | 5/2002 | Hearn et al. ............... 360/99.18 |
| 6,556,372 | B2 | 4/2003 | Hearn et al. |
| 8,031,431 | B1 | 10/2011 | Berding et al. |
| 8,279,552 | B2 | 10/2012 | Stipe |
| 8,335,050 | B2 | 12/2012 | Kavosh et al. |
| 2012/0275106 | A1 | 11/2012 | McGuire, Jr. |
| 2012/0275287 | A1 | 11/2012 | McGuire, Jr. et al. |
| 2015/0009789 | A1 | 1/2015 | Freeman |

\* cited by examiner

*Primary Examiner* — Gustavo Polo
(74) *Attorney, Agent, or Firm* — HolzerIPLaw, PC

(57) ABSTRACT

Certain embodiments of the present disclosure include a hard disc drive housing comprising a baseplate having a bottom portion and walls extending from a perimeter of the bottom portion, the walls including a clearance area; a cover that includes a planar interface surface with the baseplate, the interface surface having a width that exceeds the baseplate wall thickness in the clearance area; and a gasket configured to be compressed between the baseplate and the cover at the interface surface.

17 Claims, 10 Drawing Sheets

HARD DISC DRIVE COVER SEAL

SUMMARY

Certain embodiments of the present disclosure include a hard disc drive housing comprising a baseplate having a bottom portion and walls extending from a perimeter of the bottom portion, the walls including a clearance area; a cover that includes a planar interface surface with the baseplate, the interface surface having a width that exceeds the baseplate wall thickness in the clearance area; and a gasket configured to be compressed between the baseplate and the cover at the interface surface.

Other implementations are also described and recited herein.

BRIEF DESCRIPTIONS OF THE DRAWINGS

DETAILED DESCRIPTIONS

Historically, increasing storage capacity in hard disc drives has been achieved by increasing areal density, which has been achieved by incrementally improving head, media, and channel technology. However, as areal density has increased, the rate of its increase has slowed. Storage capacity in hard disc drives can be also increased by increasing the physical diameter of storage platters within the disc drive. However, diameters have been limited to diameters that are less than the outside width of the disc drive minus each opposing wall thickness and minus any applicable tolerances. Due to packaging requirements, the outside dimensions of a hard disc drive are predefined based on industry standard sizes (e.g., 4"×1"×1.75", 69.85 mm×9.5 mm×100 mm, etc.). These industry standard sizes are not easily changed.

Decreases in baseplate wall thickness has been limited too. A form-in-place gasket (FIPG) is typically used to seal a baseplate and a cover of the hard disc drive together in order to prevent contaminants from entering the hard disc drive. The baseplate walls are sufficiently thick to allow the FIPG to seal the cover to the baseplate under compression (e.g., by applying a number of screws compressively holding the cover to the baseplate). However, this substantial baseplate wall thickness reduces the maximum allowable size of the storage platters within the hard disc drive. For at least the reasons given above, maximum storage platter diameter has typically been 65 mm. Certain embodiments of the present disclosure are accordingly directed to devices for accommodating larger diameter storage platters.

Figure 1:
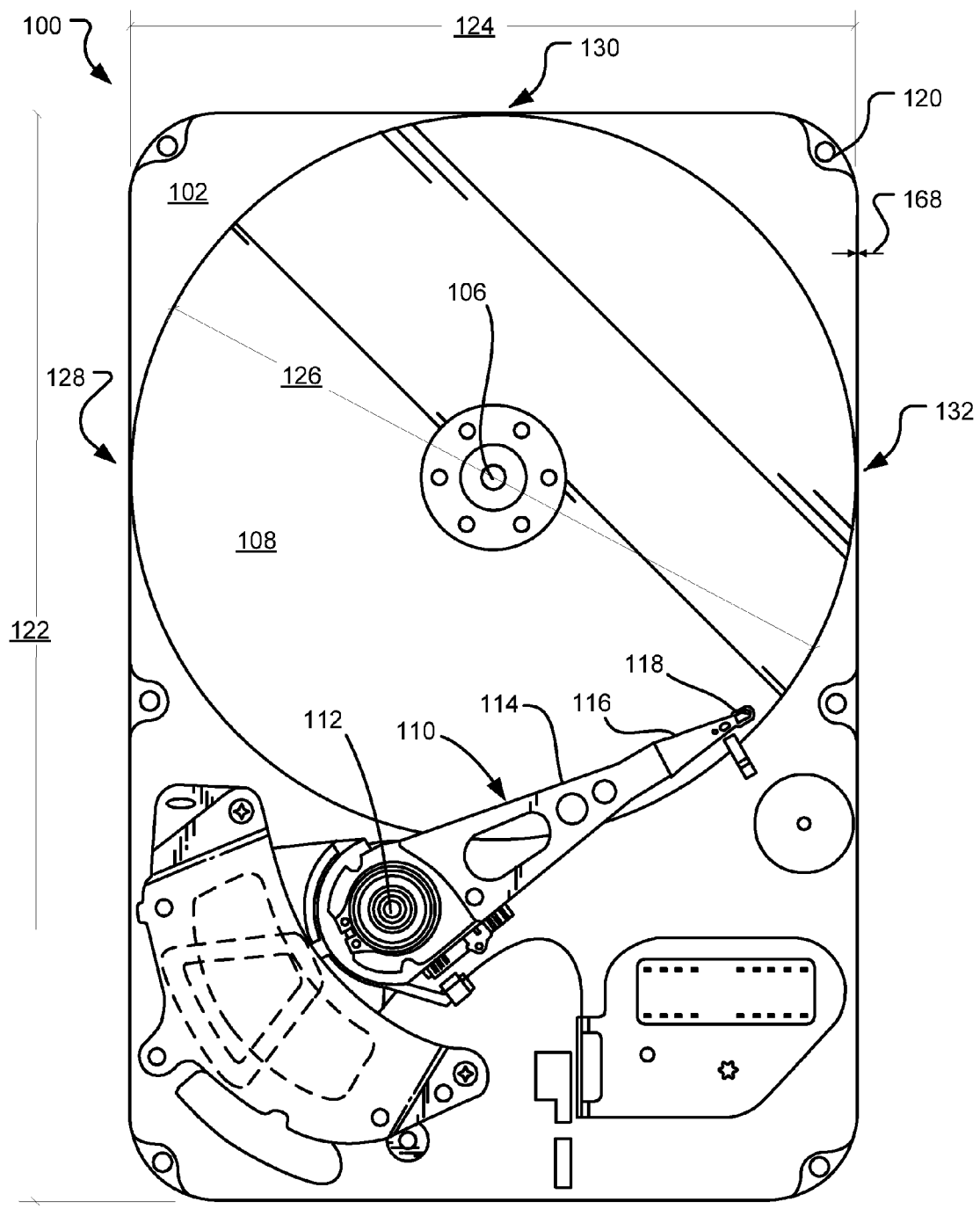
FIG. 1 illustrates a plan view of an example disc drive with clearance area seals.

FIG. 1 illustrates a plan view of an example disc drive 100 with clearance area seals. The disc drive 100 includes a base or baseplate 102 to which various components of the disc drive 100 are mounted. The components include a spindle motor 106 which rotates one or more storage medium discs or platters 108 at a high speed. Information is written to and read from tracks on the discs 108 through the use of an actuator assembly 110, which rotates during a seek operation about a bearing shaft assembly 112 positioned adjacent to the discs 108. The actuator assembly 110 includes a plurality of actuator arms 114 which extend towards the discs 108, with one or more flexures 116 extending from each of the actuator arms 114. Mounted at the distal end of each of the flexures 116 is an air bearing slider 118, which includes a head at a trailing edge of the slider 118. The slider 118 allows the head to fly in close proximity above the corresponding surface of the associated disc 108.

A cover (not shown) cooperates with the baseplate 102 to form an internal, sealed environment for the disc drive 100. More specifically, the cover is compressed against the baseplate 102 with a gasket there between and fasteners are received in holes (e.g., screw hole 120) to maintain the compression seal between the cover and the baseplate 102.

The baseplate 102 has a predefined length 122 and a predefined width 124 and a wall thickness 168. A disc 108 diameter 126 does not exceed the predefined width 124 of the baseplate. As the disc 108 diameter is increased to maximize storage capacity of the drive 100, the disc 108 diameter approaches the predefined width 124 value and the baseplate 102 wall thickness 168 is reduced or eliminated at least at one or more clearance areas (e.g., areas 128, 130, 132). Further, in some implementations, baseplate 102 wall thickness is reduced to a value less than that required to effectively utilize the gasket to seal the cover to the baseplate 102. As a result, the various alternative sealing mechanisms discussed herein may be used alone or in combination to ensure an effective seal between the cover and the baseplate 102.

Figure 2:
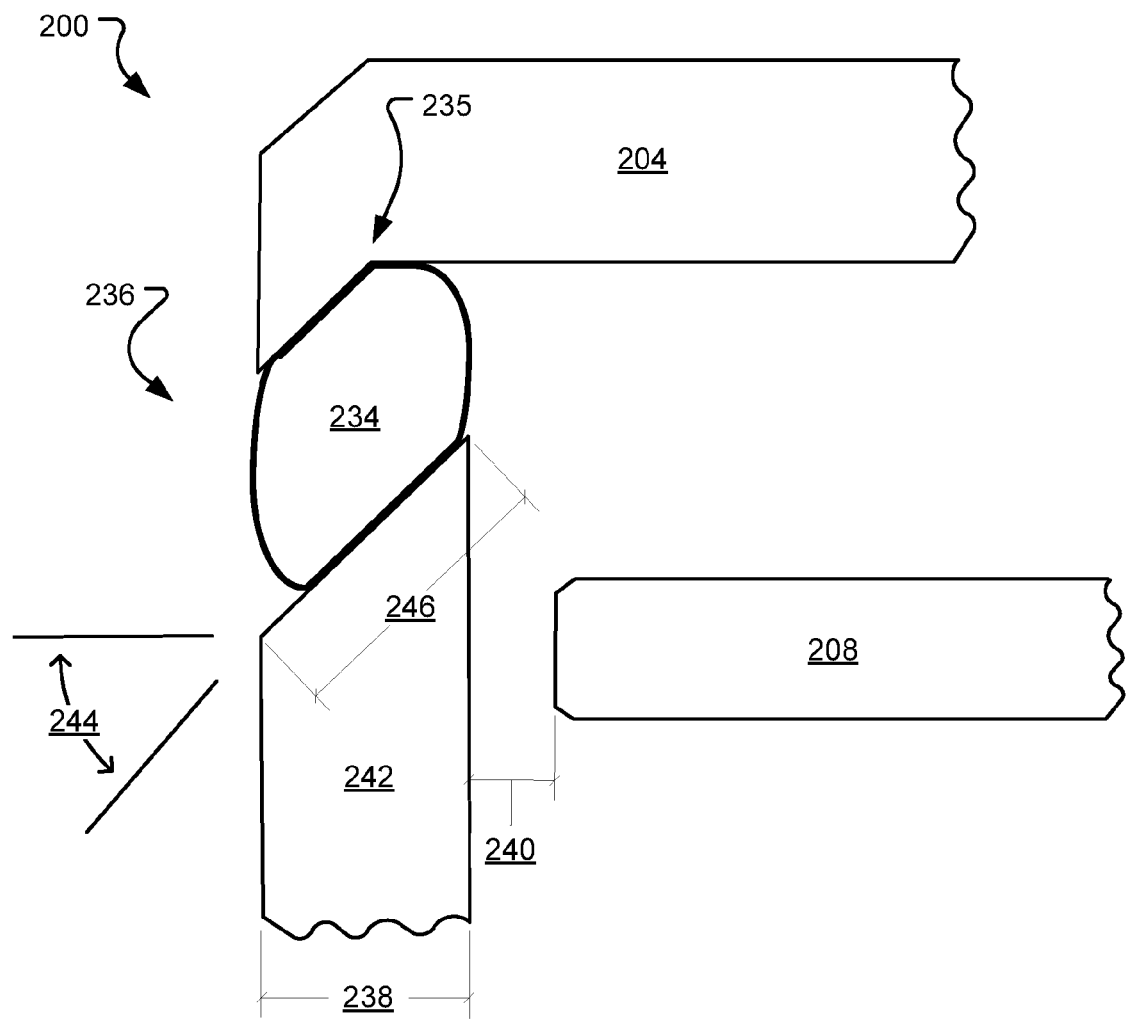
FIG. 2 illustrates an example cross-sectional elevation view of a disc drive with an example beveled seal.

FIG. 2 illustrates an example cross-sectional elevation view of a disc drive 200 with an example beveled seal 236. The disc drive 200 includes a storage disk 208 that rotates at a high speed during operation. A minimum clearance 240 is provided between the disc 208 edge and an interior wall 242 of a base of the drive 200. If the disc drive 200 has predefined outer dimensions and a predefined minimum clearance 240, any decrease in the thickness of the interior wall can yield a commensurate increase in the disc 208 diameter, and thus an overall increase in the storage capacity of the disc 208.

However, gasket 234 requires a minimum interface surface width to properly and reliably seat. If the interior wall 242 thickness 238 is less than the minimum surface area for the gasket 234 to properly and reliably seat, the beveled seal 236 may be used to increase the interface surface width (i.e., width 246). More specifically, one or more interface surfaces of the wall 242 and a matching cover 204 are beveled to create the beveled seal 236. The bevel of the wall 242 and the cover 204 may be at any angle 244 that achieves an adequate interface surface width 246 for the gasket 234 to properly and reliably seat.

In various implementations, the gasket 234 is a compressible sealing material that may be preformed or formed in place (FIPG). Further, an FIPG gasket may be formed on the cover 204 and then compressed against the base or formed on the base and compressed against the cover 204. The gasket 234 is compressed between the wall 242 and the cover 204 using, for example, fasteners (e.g., screws, not shown) that extend through the cover 204 and into the wall 242. When compressed, the gasket 234 occupies at least a substantial portion (i.e., greater than 25%) of the interface surface width 246 and in some implementations a majority (i.e., greater than 50%) of the interface surface width 246.

In one implementation, the gasket 234 is formed on the cover 204 in self-centering angle 235 of the cover 204. As a result, the gasket 234 is better maintained in a desired position on the cover 204 as the gasket 234 is compressed between the wall 242 and the cover 204.

In various implementations, angled surfaces are cast, machined, stamped, or any combination thereof on the wall(s) 242 and the cover 204 to form the beveled seal 236. In one implementation, the wall 242 is only beveled in on or more regions of the base that have a tight tolerance fit with the disc 208 (e.g., at areas 128, 130, 132) of FIG. 1. In other implementations, the wall 242 is beveled all around the top perimeter of the wall that interfaces with the cover 204. In still other implementations, the beveled interface is combined with one or more other interface types described herein.

In one example implementation, the thickness 238 is approximately 0.8 mm. An example "non-bevel" seal gasket utilizes a 1.13 mm interface surface width. If the bevel edge angle is 45 degrees, the interface surface width is increased from 0.8 mm to 1.13 mm, which brings the interface surface equal width to that required for the example gasket 234 to properly and reliably seat.

Figure 3:
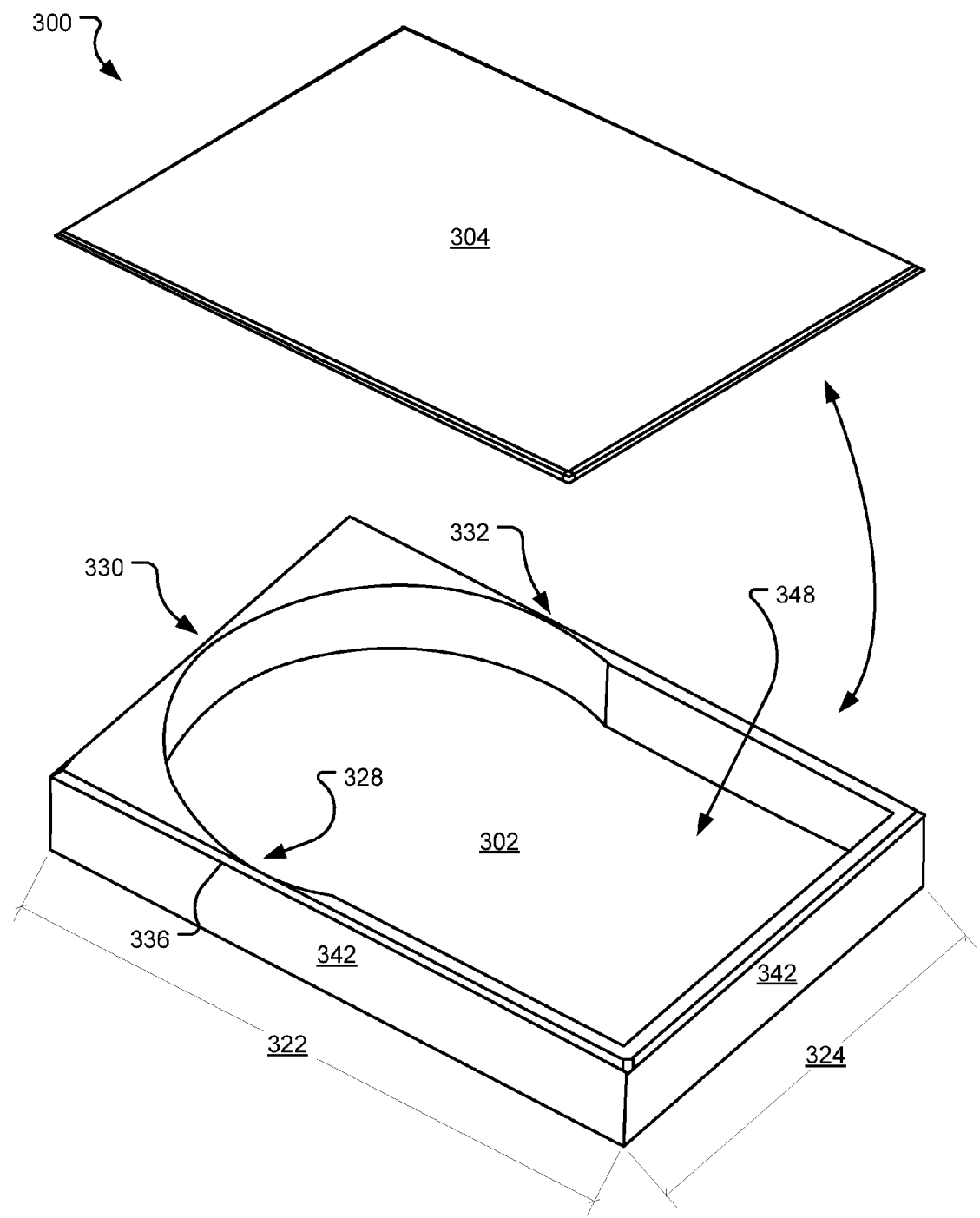
FIG. 3 illustrates a perspective view of an example disc drive housing with a beveled seal.

FIG. 3 illustrates an example disc drive housing 300 with a beveled seal 336. The housing 300 includes a baseplate 302 and a cover 304. The baseplate 302 includes a cavity 348 where internal components of the disc drive (e.g., storage discs, not shown) are stored. Baseplate walls 342 extend from an outer periphery of the bottom of the baseplate 302 to form the cavity 348. A cover 304 cooperates with the baseplate 302 to seal the internal components within the housing 300. More specifically, the cover 304 is compressed against the baseplate 302 with a gasket (not shown) there between and screws (not shown) are placed in screw holes (not shown) to maintain the compression seal between the cover 304 and the baseplate 302.

The baseplate 302 has a predefined length 322 and a predefined width 324. A storage disc diameter does not exceed the predefined width 324 of the baseplate 302. Further, as the storage disc diameter is increased to maximize storage capacity of the storage drive, the disc diameter approaches the predefined width 324 value and the baseplate 302 wall thickness is reduced at least at one or more clearance areas (e.g., areas 328, 330, 332). Further, the baseplate 302 wall thickness is reduced to a value less than that required to effectively utilize the gasket to seal the cover 304 to the baseplate 302.

In order to effectively utilize the gasket to seal the cover 304 to the baseplate 302 in at least one of areas 328, 330, 332, the interface surfaces of the walls 342 and the matching cover 304 are beveled to create a beveled seal 336 around the periphery of the cover 304 and the baseplate 302. The bevel of the walls 342 and the cover 304 may be at any angle that achieves an adequate interface surface width for the gasket to properly and reliably seat between the baseplate 302 and the cover 304. When assembled, the gasket occupies at least a substantial portion (i.e., greater than 25%) of the interface surface width and in some implementations a majority (i.e., greater than 50%) of the interface surface width. Further, in areas of the walls 342 that are thicker, the walls 342 are chamfered to match the beveled areas 328, 330, 332.

In other implementations, the walls 342 may not be chamfered or beveled in areas with sufficient thickness. Further, in another implementation, the wall 342 is only beveled at one or more of areas 328, 330, 332 (see e.g., FIG. 4). In other implementations, the wall 342 is beveled all around the top perimeter of the wall that interfaces with the cover 304. In still other implementations, the beveled interface is combined with one or more other interface types described herein.

In one example implementation, the predefined length 322 is 100.35 mm and the predefined width 324 is 69.85 mm. By using a 45 degree beveled seal 336 in areas 328, 332, the wall thickness in areas 328, 322 may be reduced from 1.13 mm to 0.8 mm. With a 0.3 mm wall to disc clearance, the disc diameter may be increased to 67.66 mm. Commensurate improvements in disc diameter may be achieved with different predefined length 322 and/or predefined width 324 values.

Figure 4:
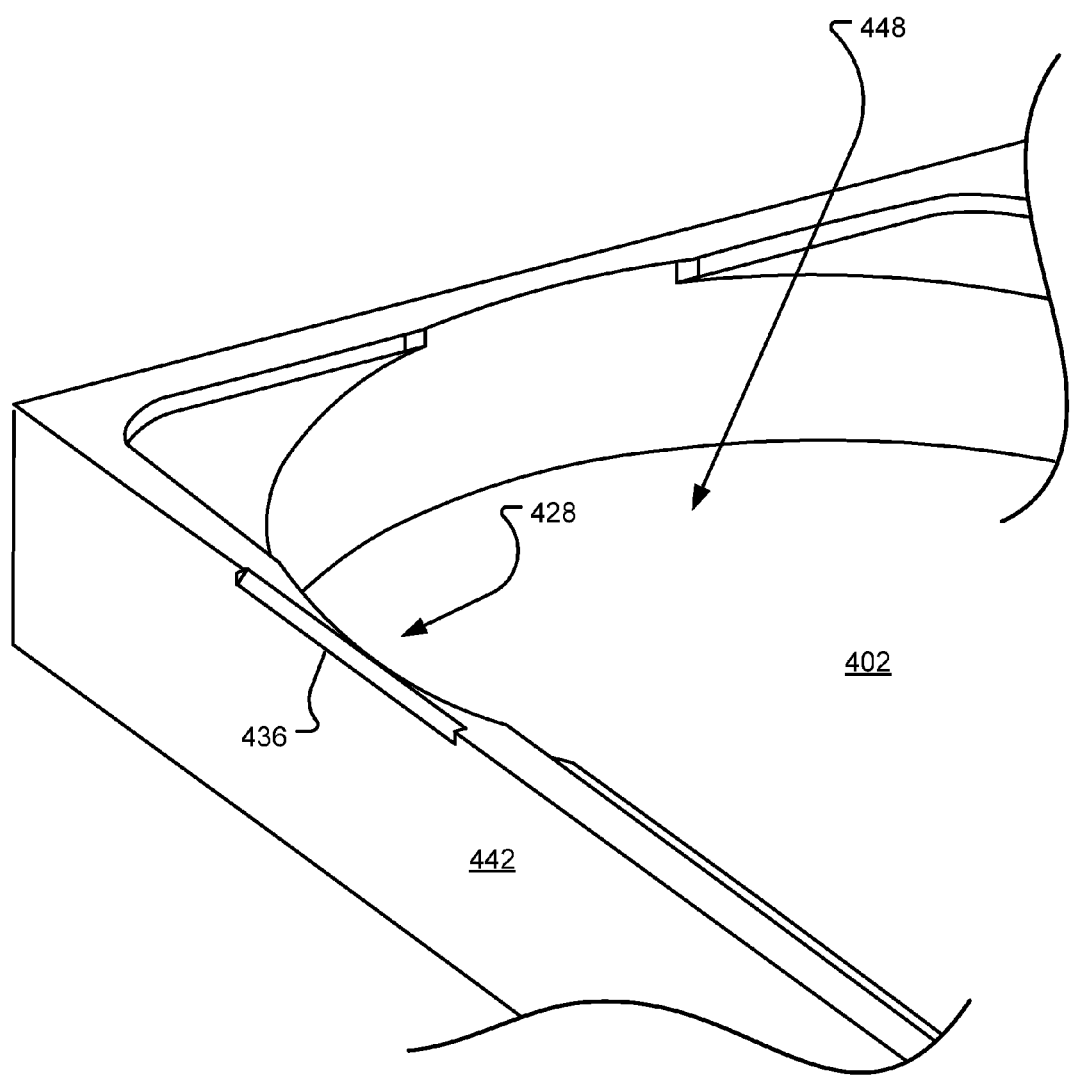
FIG. 4 illustrates a partial perspective view of an example disc drive baseplate with a beveled seal.

FIG. 4 illustrates a partial perspective view of an example disc drive baseplate 402 with a beveled seal 436. The baseplate 402 includes a cavity 448 where internal components of the disc drive (e.g., storage discs, not shown) are stored. Baseplate walls (e.g., wall 442) extend from an outer periphery of the bottom of the baseplate 402 to form the cavity 448. A cover (not shown) is compressed against the baseplate 402 with a gasket (not shown) there between to seal the internal components in the cavity 448.

In order to effectively utilize the gasket to seal the cover to the baseplate 402 in area 428, an interface surface of the wall 342 and the matching cover is beveled to create the beveled seal 436 at area 428. Other areas of the walls that interface with the cover are thicker than in area 428 and do not utilize a beveled seal. The bevel of the wall 442 and the cover may be at any angle that achieves an adequate interface surface width for the gasket to properly and reliably seat at area 428. When assembled, the gasket occupies at least a substantial portion (i.e., greater than 25%) of the interface surface width and in some implementations a majority (i.e., greater than 50%) of the interface surface width.

In an example implementation, the beveled seal 436 is 20 mm long and has a 45 degree angle. If the wall thickness is 0.8 mm, then the corresponding interface surface width of the beveled seal 436 is 1.13 mm. In various other implementations, multiple beveled seals may be used in multiple areas of the baseplate 402 and corresponding cover. Still further, the size and angle of the beveled seal 436 may vary. In still other implementations, the beveled seal 436 is combined with one or more other interface types described herein.

Figure 5:
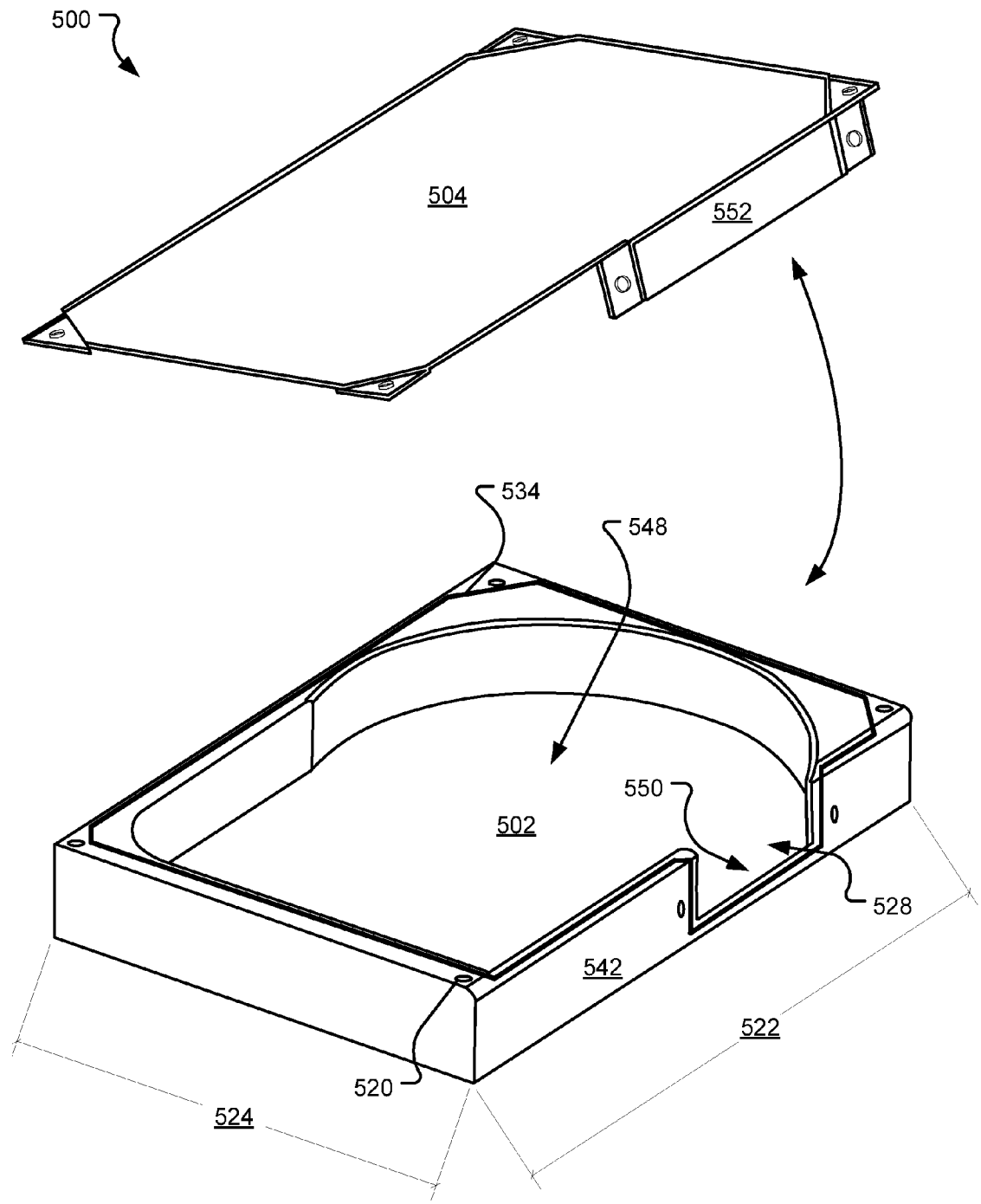
FIG. 5 illustrates a perspective view of a first example disc drive housing with a wrap-around seal.

FIG. 5 illustrates a perspective view of a first example disc drive housing 500 with a wrap-around seal 550. A baseplate 502 includes a cavity 548 where internal components of the disc drive (e.g., storage discs, not shown) are stored. Baseplate walls (e.g., wall 542) extend from an outer periphery of the bottom of the baseplate 502 to form the cavity 548. A cover 504 cooperates with the baseplate 502 to seal the internal components within the housing 500. More specifically, the cover 504 is compressed against the baseplate 502 with a gasket 534 there between and screws (not shown) are placed in screw holes (e.g., hole 520) to maintain the compression seal between the cover 504 and the baseplate 502.

The baseplate 502 has a predefined length 522 and a predefined width 524. A storage disc diameter does not exceed the predefined width 524 of the baseplate 502. Further, as the storage disc diameter is increased to maximize storage capacity of the storage drive, the disc diameter approaches the predefined width 524 value and the baseplate 502 wall thickness is reduced to zero at clearance area 528. As a result, the gasket 534 is diverted around the clearance area 528 in order to maintain a continuous seal between the baseplate 502 and the cover 504.

More specifically, the wrap-around seal 550 includes an open area or a window in the baseplate 502 in the clearance area 528. The gasket 534 wraps around a periphery of the open area. The cover 504 includes a matching tab 552 that covers the open area in the baseplate 502 in the clearance area 528 when the cover 504 is attached to the baseplate 502. The tab 552 and wall 542 further includes screw holes (e.g., hole 520) that maintain the compression seal between the cover 504 and the baseplate 502 around the open area.

When assembled, the gasket 534 occupies at least a substantial portion (i.e., greater than 25%) of the interface surface (i.e., a common planar surface area shared by the wall 542 and the tab 552) width around the open area in the clearance area 528 and in some implementations a majority (i.e., greater than 50%) of the interface surface width around the open area in the clearance area 528. In other implementations, additional wrap-around seals are applied to additional clearance areas of the housing 500. In still other implementations, the wrap-around seal 550 is combined with one or more other interface types described herein.

In one example implementation, the predefined length 522 is 100.35 mm and the predefined width 524 is 69.85 mm. By using a wrap-around seal 550 in area 528, the disc diameter may be increased to 67.78 mm. Commensurate improvements in disc diameter may be achieved with different predefined length 522 and/or predefined width 524 values.

Figure 6:
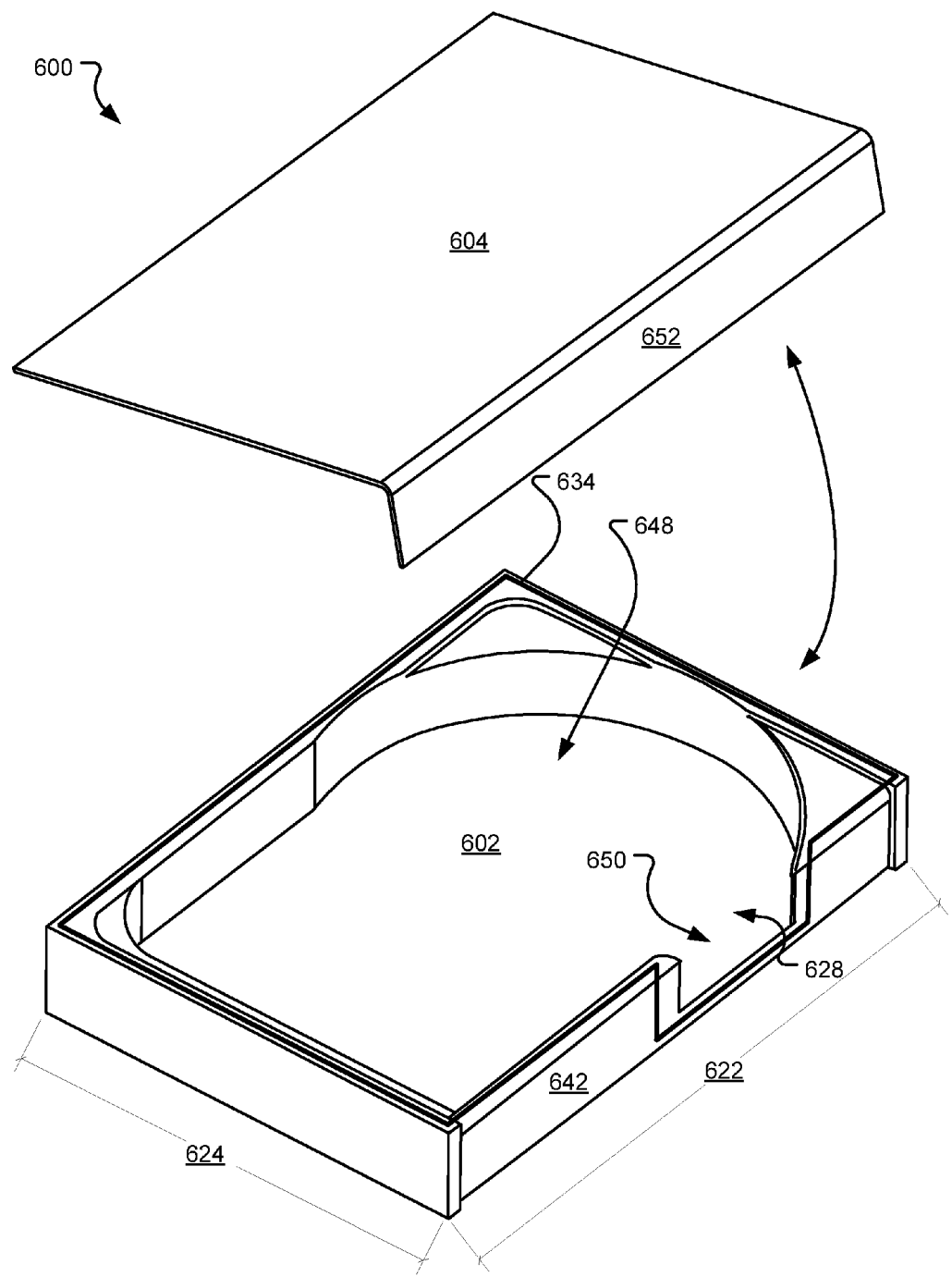
FIG. 6 illustrates a perspective view of a second example disc drive housing with a wrap-around seal.

FIG. 6 illustrates a perspective view of a second example disc drive housing 600 with a wrap-around seal 650. A baseplate 602 includes a cavity 648 where internal components of the disc drive (e.g., storage discs, not shown) are stored. Baseplate walls (e.g., wall 642) extend from an outer periphery of the bottom of the baseplate 602 to form the cavity 648. A cover 604 cooperates with the baseplate 602 to seal the internal components within the housing 600. More specifically, the cover 604 is compressed against the baseplate 602 with a gasket 634 there between.

The baseplate 602 has a predefined length 622 and a predefined width 624. A storage disc diameter does not exceed the predefined width 624 of the baseplate 602. Further, as the storage disc diameter is increased to maximize storage capacity of the storage drive, the disc diameter approaches the predefined width 624 value and the baseplate 602 wall thickness is reduced to zero at clearance area 628. As a result, the gasket 634 is diverted around the clearance area 628 in order to maintain a continuous seal between the baseplate 602 and the cover 604.

More specifically, the wrap-around seal 650 includes an open area or a window in the baseplate 602 in the clearance area 628. The gasket 634 wraps around a periphery of the open area. The cover 604 includes a full length tab 652 that overlaps the wall 642, including the open area in the baseplate 602 in the clearance area 628 when the cover 604 is attached to the baseplate 602. In other implementations, the wrap-around seal 650 is combined with one or more other interface types described herein.

In one example implementation, the predefined length 622 is 100.35 mm and the predefined width 624 is 69.85 mm. By using a wrap-around seal 650 in area 628, the disc diameter may be increased from 67 mm to 67.78 mm. Commensurate improvements in disc diameter may be achieved with different predefined length 622 and/or predefined width 624 values.

Figure 7:
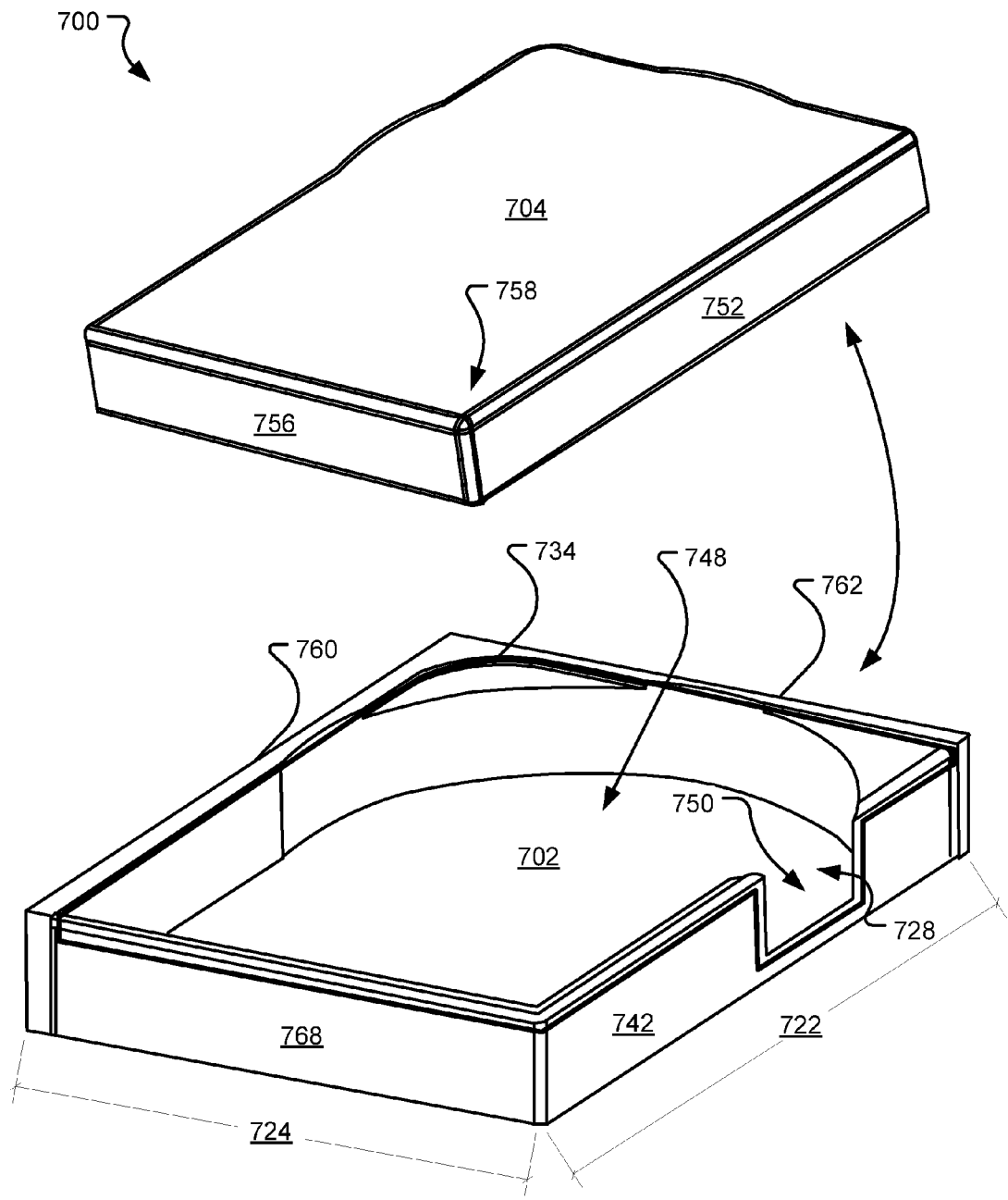
FIG. 7 illustrates a perspective view of a first example disc drive housing with a box-corner cover and a wrap-around seal.

FIG. 7 illustrates a perspective view of a first example disc drive housing 700 with a box-corner cover 704 and a wrap-around seal 750. A baseplate 702 includes a cavity 748 where internal components of the disc drive (e.g., storage discs, not shown) are stored. Baseplate walls 742, 760, 762, 768 extend from an outer periphery of the bottom of the baseplate 702 to form the cavity 748. The box-corner cover 704 cooperates with the baseplate 702 to seal the internal components within the housing 700.

More specifically, the cover 704 is a box-corner design (i.e., it has a planar top portion with two cover walls 752, 756 extending there from). The walls 752, 756 are adjacent one another and form a boxed corner 758 on the cover 704. The cover 704 is compressed against the baseplate 702 with a gasket 734 there between.

The baseplate 702 has a predefined length 722 and a predefined width 724. A storage disc diameter does not exceed the predefined width 724 of the baseplate 702. Further, as the storage disc diameter is increased to maximize storage capacity of the storage drive, the disc diameter approaches the predefined width 724 value and the baseplate 702 wall thickness is reduced to zero at clearance area 728. As a result, the gasket 734 is diverted around the clearance area 728 in order to maintain a continuous seal between the baseplate 702 and the cover 704.

More specifically, the wrap-around seal 750 includes an open area or a window in the baseplate 702 in the clearance area 728. The gasket 734 wraps around a periphery of the open area. The cover wall 752 overlaps the wall 742, including the open area in the baseplate 702 in the clearance area 728 when the cover 704 is attached to the baseplate 702. In other implementations, the wrap-around seal 750 is combined with one or more other interface types described herein.

The housing 700 includes a lip on walls 760, 762 where the cover 704 seats with the baseplate 702. The gasket 734 may reside on the underside of the cover 704 or on an edge of the cover when it interfaces with the lip on walls 760, 762. On walls 742, 768, the gasket 734 moves to outside facing surfaces of the walls 742, 768. In other implementations, the gasket 734 resides on a top facing surface of the walls 742, 768.

In one example implementation, the predefined length 722 is 100.35 mm and the predefined width 724 is 69.85 mm. By using a wrap-around seal 750 in area 728 and the perimeter seal 734, the disc diameter may be increased to 68.4 mm. Commensurate improvements in disc diameter may be achieved with different predefined length 722 and/or predefined width 724 values.

Figure 8:
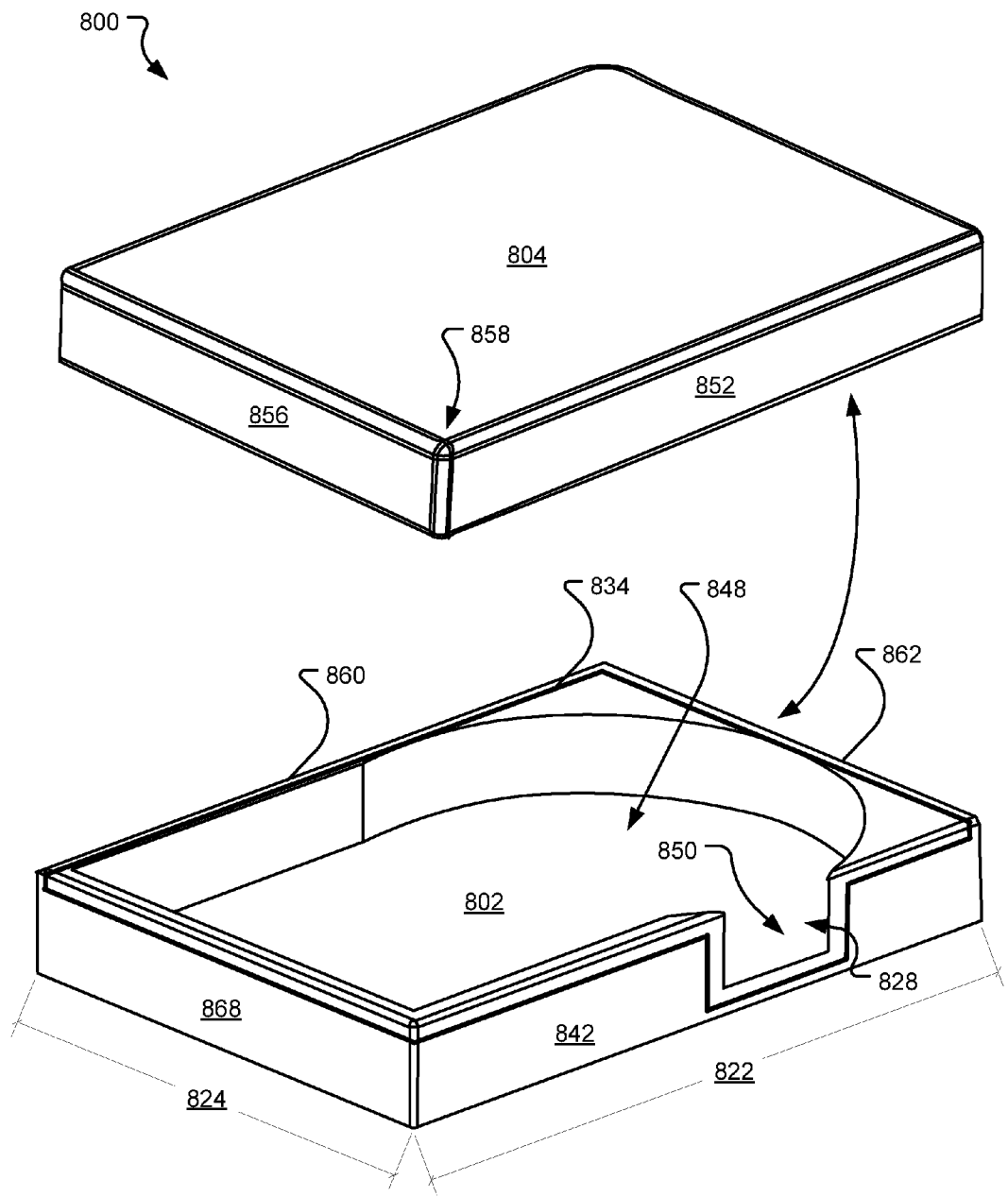
FIG. 8 illustrates a perspective view of a second example disc drive housing with a box-corner cover and a wrap-around seal.

FIG. 8 illustrates a perspective view of a second example disc drive housing 800 with a box-corner cover 804 and a wrap-around seal 850. A baseplate 802 includes a cavity 848 where internal components of the disc drive (e.g., storage discs, not shown) are stored. Baseplate walls 842, 860, 862, 868 extend from an outer periphery of the bottom of the baseplate 802 to form the cavity 848. The box-corner cover 804 cooperates with the baseplate 802 to seal the internal components within the housing 800.

More specifically, the cover 804 is a box-corner design (i.e., it has a planar top portion with two cover walls 852, 856 extending there from. The walls 852, 856 are adjacent one another and form a boxed corner 858 on the cover 804. The cover 804 is compressed against the baseplate 802 with a gasket 834 there between.

The baseplate 802 has a predefined length 822 and a predefined width 824. A storage disc diameter does not exceed the predefined width 824 of the baseplate 802. Further, as the storage disc diameter is increased to maximize storage capacity of the storage drive, the disc diameter approaches the predefined width 824 value and the baseplate 802 wall thickness is reduced to zero at clearance area 828. As a result, the gasket 834 is diverted around the clearance area 828 in order to maintain a continuous seal between the baseplate 802 and the cover 804.

More specifically, the wrap-around seal 850 includes an open area or a window in the baseplate 802 in the clearance area 828. The gasket 834 wraps around a periphery of the open area. The cover wall 852 overlaps the wall 842, including the open area in the baseplate 802 in the clearance area 828 when the cover 804 is attached to the baseplate 802. In other implementations, the wrap-around seal 850 is combined with one or more other interface types described herein.

As distinct from housing 700 of FIG. 7, the housing 800 does not include a lip on walls 860, 862 where the cover 804 seats with the baseplate 802. The gasket 834 resides on the underside of the cover 804 and top edges of the walls 860, 862, when assembled. On walls 842, 868, the gasket 834 moves to outside facing surfaces of the walls 842, 868. In other implementations, the gasket 834 resides on a top facing surface of the walls 842, 868.

In one example implementation, the predefined length 822 is 100.35 mm and the predefined width 824 is 69.85 mm. By using a wrap-around seal 850 in area 828, the disc diameter may be increased to 67.78 mm. Commensurate improvements in disc diameter may be achieved with different predefined length 822 and/or predefined width 824 values.

Figure 9:
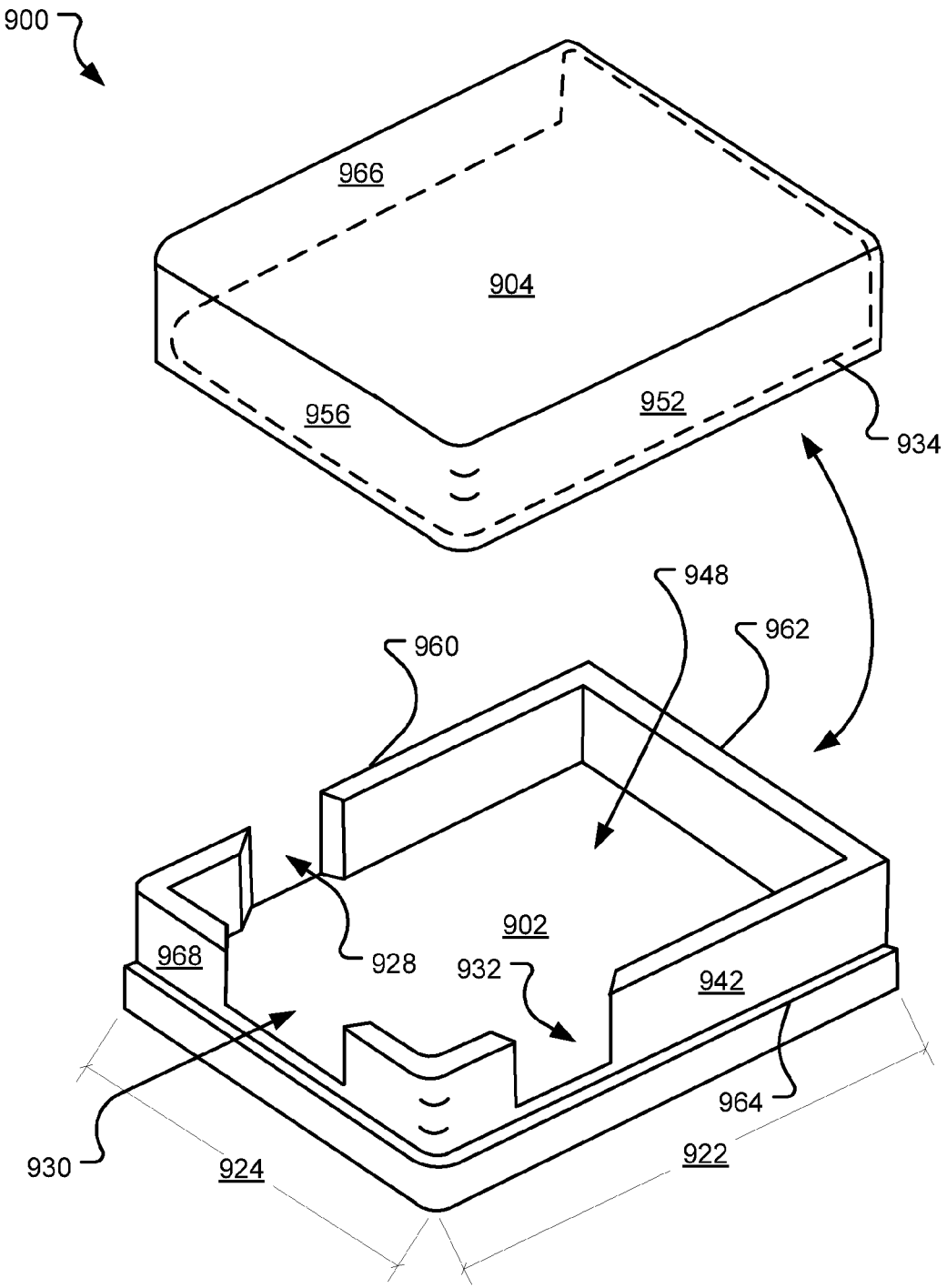
FIG. 9 illustrates a perspective view of a first example disc drive housing with an open box cover.

FIG. 9 illustrates a perspective view of a first example disc drive housing 900 with an open box cover 904. A baseplate 902 includes a cavity 948 where internal components of the disc drive (e.g., storage discs, not shown) are stored. Baseplate walls 942, 960, 962, 968 extend from a periphery of the bottom of the baseplate 902 to form the cavity 948. Further, the bottom of the baseplate 902 includes a bottom lip 964 of the sides corresponding to walls 942, 960, 962, 968. The open box cover 904 cooperates with the baseplate 902 to seal the internal components within the housing 900.

More specifically, the cover 904 is an open box design (i.e., it has a planar top portion with three cover walls 952, 956, 966 extending there from). The planar top and the walls 952, 956, 966 form a box with an open bottom and one open side. The cover 904 is compressed against the baseplate 902 with a gasket 934 positioned there between.

The baseplate 902 has a predefined length 922 and a predefined width 924. A storage disc diameter does not exceed the predefined width 924 of the baseplate 902. Further, as the storage disc diameter is increased to maximize storage capacity of the storage drive, the disc diameter approaches the predefined width 924 value and the baseplate 902 wall thickness is reduced to zero at clearance areas 928, 930, 932.

The gasket 934 (shown in hidden dashed lines under the cover 904) may be applied to interior surfaces of the walls 952, 956, 966 near the bottom edge of the cover 904. The gasket 934 interfaces with a lower area of the walls 942, 960, 968 below the clearance areas 928, 930, 932 where the walls 942, 960, 968 are contiguous. Since the gasket interface is below the clearance areas 928, 930, 932 in each of the walls 942, 960, 968, an open area or window in each of the walls 942, 960, 968 does not affect the sealing of the cover 904 to the baseplate 902. Since wall 962 does not include a clearance area, the wall 962 may be made sufficiently thick to accommodate a tradition gasket seal residing on the top surface of the wall 962. As such, the gasket 934 is depicted running across an interior surface of the cover 904 where the cover interfaces with the wall 962.

The cover walls 952, 956, 966 overlap the base walls 942, 968, 960, respectively, which includes the open areas in the baseplate 902 in the clearance areas 928, 930, 932 when the cover 904 is attached to the baseplate 902. In other implementations, the open box cover 904 seal is combined with one or more other interface types described herein.

In one implementation, the cover walls 952, 956, 966 and the base walls 942, 968, 960, 962 are substantially vertically oriented. As a result, the cover 904 may be installed primarily by sliding the cover 904 onto the base 902 in the lengthwise direction. In another implementation, the base walls 942, 968, 960, 962 are slightly tapered inward (e.g., less than 5 degrees or less than 1 degree). This enables the cover 904 to be installed substantially vertically onto the base 902 without interference fitment occurring until the cover 904 is substantially in place. In yet another implementation, the cover walls 952, 956, 966 are slightly tapered outward (e.g., less than 5 degrees or less than 1 degree). This also enables the cover 904 to be installed substantially vertically onto the base 902 without interference fitment occurring until the cover 904 is substantially in place. In still another implementation, both the base walls 942, 968, 960, 962 are slightly tapered inward and the cover walls 952, 956, 966 are slightly tapered outward to allow the cover 904 to be installed substantially vertically onto the base 902.

In one example implementation, the predefined length 922 is 100.35 mm and the predefined width 924 is 69.85 mm. By using a wrap-around seal 950 in areas 928 and 932, the disc diameter may be increased to 68.55 mm. Commensurate improvements in disc diameter may be achieved with different predefined length 922 and/or predefined width 924 values.

Figure 10:
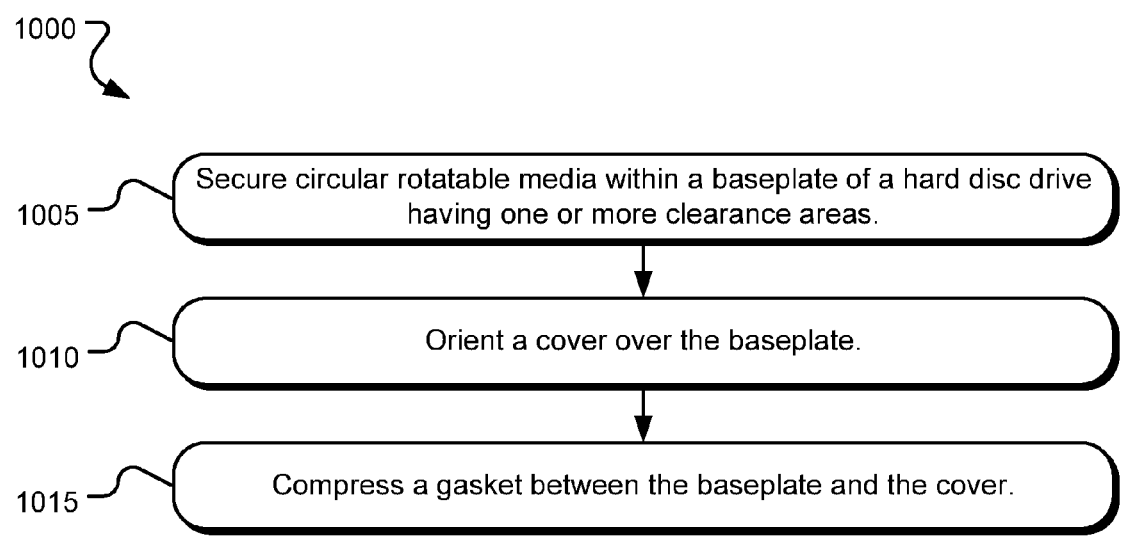
FIG. 10 illustrates operations for assembling a hard disc drive housing having a clearance area seal.

FIG. 10 illustrates operations 1000 for assembling a hard disc drive housing having a clearance area seal. In a securing operation 1005, one or more circular rotatable media are secured within a baseplate of a hard disc drive. The baseplate generally includes a bottom portion and walls extending from a perimeter of the bottom portion, which forms a cavity where the circular rotatable media are secured. One or more clearance areas are provided between the circular rotatable media and the baseplate walls. The circular rotatable media are generally mounted on a motorized axis. Additional electronic components may also be secured within the baseplate.

An orienting operation 1010 orients a cover over the baseplate. The cover interfaces with the baseplate with a gasket there between. The interface between the baseplate, the gasket, and the cover in the clearance areas may utilize one or more of the tight clearance sealing mechanisms and techniques described in detail herein. A compressing operation 1015 compresses the gasket between the baseplate and the cover. This seals the circular rotatable media and other electronic components within the hard disc drive The sealing techniques described and claimed herein may apply to any rotating disc storage drive. The logical operations making up the embodiments of the invention described herein are referred to variously as operations, steps, objects, or modules. Furthermore, it should be understood that logical operations may be performed in any order, adding or omitting operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A hard disc drive housing comprising:
   a baseplate having a bottom portion and walls extending from a perimeter of the bottom portion, at least one of the walls including a clearance area;
   a cover that includes an inclined planar interface surface with the baseplate, the interface surface having a width that exceeds the baseplate wall thickness in the clearance area, the interface surface of the cover having an angled lip; and
   a gasket configured to be compressed between the baseplate and the cover at the interface surface.

2. The hard disc drive housing of claim 1, wherein the baseplate includes a planar interface surface that matches the planar interface surface of the cover.

3. The hard disc drive housing of claim 2, wherein the planar interface surface of the baseplate is achieved by applying a bevel to one or more of the walls extending from the bottom portion of the baseplate.

4. The hard disc drive housing of claim 3, wherein the bevel is applied to a discrete area of the one or more walls.

5. The hard disc drive housing of claim 1, wherein the gasket occupies a substantial portion of the interface surface when compressed between the baseplate and the cover.

6. The hard disc drive housing of claim 1, wherein the baseplate wall thickness in the clearance area is zero and the clearance area includes a window.

7. The hard disc drive housing of claim 6, wherein the cover includes a tab that covers the window in the clearance area.

8. The hard disc drive housing of claim 7, wherein the gasket is configured to be compressed between the tab and the wall around the clearance area and occupies a substantial portion of the interface surface.

9. The hard disc drive housing of claim 6, wherein the cover includes a wall that covers the window in the clearance area.

10. The hard disc drive housing of claim 6, wherein the cover includes two or more adjacent walls, wherein at least one of the adjacent walls covers the window in the clearance area.

11. The hard disc drive housing of claim 10, wherein the planar interface surface of the cover is an interior surface of one or more of the adjacent walls.

12. The hard disc drive housing of claim 1, wherein the walls extending from a perimeter of the bottom portion of the baseplate vertically taper inward.

13. The hard disc drive housing of claim 1, further comprising:
    one or more circular rotatable storage media secured within the baseplate.

14. A method of assembling a hard disc drive housing comprising: orienting a cover over a baseplate, the baseplate including a bottom portion and walls extending from a perimeter of the bottom portion, the walls including a clearance area, wherein the cover includes an inclined planar interface surface with the baseplate, the interface surface having a width that exceeds the baseplate wall thickness in the clearance area, the interface surface of the cover having an angled lip; and
    compressing a gasket between the baseplate and the cover at the interface surface.

15. The method of claim 14, wherein the walls include a beveled upper edge.

16. The method of claim 14, wherein the clearance area includes an opening therein.

17. The hard disc drive housing of claim 1, wherein the angled lip is present at one or more areas of the periphery of the cover.

\* \* \* \* \*